(12) United States Patent
Cordia (10) Patent No.: US 7,108,236 B2
(45) Date of Patent: Sep. 19, 2006

(54) ACCESSORY FOR A LIQUID CONTAINER, IN PARTICULAR A BEVERAGE CONTAINER

(76) Inventor: Anne Louise Cordia, Peperstraat 68, 2801 RG Gouda (NL)

( * ) Notice: Subject to any disclaimer, the term of this patent is extended or adjusted under 35 U.S.C. 154(b) by 0 days.

(21) Appl. No.: 09/995,422

(22) Filed: Nov. 27, 2001

(65) Prior Publication Data

US 2002/0035933 A1    Mar. 28, 2002

Related U.S. Application Data

(63) Continuation of application No. PCT/NL00/00362, filed on May 26, 2000.

(30) Foreign Application Priority Data

May 28, 1999 (NL) .................................. 1012174

(51) Int. Cl.
*A47B 96/06* (2006.01)
(52) U.S. Cl. .............................. 248/213.2; 248/229.16
(58) Field of Classification Search ............. 248/213.2,
248/229.1, 229.16, 229.26, 311.2; 431/289;
215/386; 100/133, 110, 233; 426/104; 222/541,
222/20
See application file for complete search history.

(56) References Cited

U.S. PATENT DOCUMENTS

| | | | | |
|---|---|---|---|---|
| 1,237,504 | A | * | 8/1917 | Graham ...................... 248/37.3 |
| 1,386,078 | A | * | 8/1921 | Schultze ....................... 211/14 |
| 2,378,660 | A | | 6/1945 | Roux |
| 2,597,275 | A | * | 5/1952 | Ahlstrand ................... 248/37.6 |
| 2,736,657 | A | * | 2/1956 | Schares |
| 3,298,206 | A | * | 1/1967 | Hingston ..................... 431/289 |
| 3,754,502 | A | * | 8/1973 | Kaufman ..................... 100/133 |
| 5,823,483 | A | * | 10/1998 | Gaskill ....................... 248/37.6 |
| 5,823,493 | A | * | 10/1998 | Eastland et al. .......... 248/213.2 |

FOREIGN PATENT DOCUMENTS

NL        8800568 A    * 10/1989

* cited by examiner

*Primary Examiner*—Ramon O Ramirez
(74) *Attorney, Agent, or Firm*—Ladas & Parry LLP (57) ABSTRACT

Accessory for a liquid container (20), in particular a beverage container, such as a glass or a cup, having a main body and two clamping members (2, 3, 13) to be placed on either side of the upper edge of the liquid container and integrally formed with the main body, which in unloaded situation leave an insertion opening (23) for the edge open, the first clamping member (5, 6) intended for engagement of the inner side of the liquid container being provided with at least two first clamping surfaces spaced apart in edge circumferential direction and the second clamping member (13) intended for engagement of the outer side of the liquid container being provided with a second clamping surface situated in between them, in which the first clamping member is provided with portions extending with a directional component in edge direction, on which portions the first clamping surfaces are situated, which portions are deformable, in particular bendable, in a plane parallel to the plane in which the edge of the liquid container is situated.

32 Claims, 6 Drawing Sheets

ACCESSORY FOR A LIQUID CONTAINER, IN PARTICULAR A BEVERAGE CONTAINER

This application is a continuation of copending International Application PCT/NL00/00362 filed on May 26, 2000, which designated the U.S., was published in English claims the benefit thereof and incorporates the same by reference.

BACKGROUND OF THE INVENTION

The invention relates to an accessory for a liquid container, in particular a beverage container, such as a glass for a soft drink or beer, or tea, or a cup or mug for it.

It may be desirable to separately serve or add an ingredient for the beverage to the beverage in the beverage container. An example of this is a slice of lemon with a glass of white beer. Another example is a tea bag.

It may also be desirable to add something special, sometimes festive or something striking to a beverage container. An example of this is an ornament, such as an animal figure. An other example is an advertisement picture.

From U.S. Pat. No. 3,754,502 a little cup or a slice of lemon is known, which has a curved shape and which at the concave side at the top is provided with a hook with which the little cup can be hung from the upper edge of the glass. The little cup is deformable in order to be pressed in to squeeze the slice of lemon, the juice escaping through the bottom of the little cup.

From Dutch patent application 88.00568 another holder for a lemon slice is known, consisting of two hingeably connected lemon slice-shaped halves.

Both halves are provided with lip portions, which in closed position of the holder form a lip which with the rest of the holder defines an accommodation space for the edge of a glass. The holder is designed to extend above the contents of the glass in the positioned situation. Both halves of the holder can be pressed together in order to squeeze the lemon slice, the juice escaping through a channel.

A drawback of the aforementioned known accessories for liquid or beverage containers is that their positioning on the beverage containers is far from stable and that they are suitable fur only a limited number of (beverage) container sizes. It may therefore occur that the lemon slice holders fall from the glass while serving the beverage and the lemon slice gets dirty. Also during drinking, the lemon slice holder may fall from the glass, so that a provision has to be made to be able store the lemon slice holder away. In order to facilitate the drinking in the above-mentioned second proposal the holder first has to be removed from the glass in any ease.

SUMMARY OF THE INVENTION

It is an object of the invention to improve on this, and to that end provides an accessory for a liquid container, in particular a beverage container, such as a glass or a cup, comprising a main body and two clamping members to be placed on either side of the upper edge of the liquid container and integrally formed with the main body, which in unloaded situation leave an insertion opening for the edge open, the first clamping member intended for engagement of the inner side of the liquid container being provided with at least two first clamping surfaces spaced apart in edge circumferential direction and the second clamping member intended for engagement of the outer side of the liquid container being provided with a second clamping surface situated in between them, in which the first clamping member is provided with portions extending with a directional component in edge direction, on which portions the first clamping surfaces are situated, which portions are rotatable or deformable, in particular bendable, in a plane parallel to the plane in which the edge of the liquid container is situated.

In this way a kind of three-point clamping is provided, having two outer clamping points at the concave side of the liquid container, with which the accessory can be attached to the liquid container with a large degree of stability. The danger of involuntary detachment from the liquid container is thus minimized. Positioning the accessory onto the edge of the liquid container can take place easily, without damaging said edge, in which the deformability in the horizontal plane guarantees a good fit with a range of the liquid containers having edges of various diameters.

Preferably the two first clamping surfaces, as seen in circumferential direction, are situated at the ends of the accessory, so that the stability of the clamping is maximized.

Preferably said portions are elastically deformable, as a result of which the fit and the clamping action—also when used repetitively and many times—is optimal.

Preferably the two first clamping surfaces are spring mounted with respect to the second clamping member and/or spring mounted with respect to each other. As a result a good clamping action is obtained each time also with a large variation in curves of the liquid container.

Preferably the first clamping surfaces are provided with edges that face away from each other, which edges have a convex course, as a result of which also in inclined position of the accessory the distance one to the other of the two first clamping surfaces remains substantially the same and the clamping action will be substantially equal to tho one obtained when the accessory would have boon positioned straight. This is particularly advantageous in catering circumstances, where the required speed of working will soon entail inclined positioning of the accessory.

Preferably the convex curve is such that the center or centers of said curve will be situated in an area between both first clamping surfaces.

The first clamping member preferably substantially has the shape of a band which may or may not be partially circumferential, such as half a ring or an (almost) complete ring, of which the points of curvature or centres. Furthermore an open construction is provided in this way and material is saved on.

When the first and the second clamping member are springily connected to each other, in particular springy in a vertical plane, the fit on the upper edge of the liquid container is further improved.

Preferably the first clamping member in unloaded situation is substantially situated in one plane, so that the contact area of the clamping surfaces with the usually concave inner surface of the liquid container will remain small.

Preferably the second clamping member itself forms a holder, for holding an added object, for instance containing an ingredient or an aid for the beverage or another liquid or a gift. In a further development according to the invention the container itself then comprises third and fourth clamping members for holding the added object through clamping, which two clamping members are formed on respective arms which extend from both first clamping surfaces and in which said two clamping members are substantially radially oriented. The third and fourth clamping members are able to hold an ingredient until it has to be used, in which case the ingredient can easily be removed—for instance in case of a tea bag—or can be pressed further between said clamping members—for instance in case of a slice of lemon—.

Preferably in that case also the arms are spring mounted with respect to each other, so that the clamping force may be larger in a larger mutual distance of the third and fourth clamping member.

The two aforementioned arms may be formed by the aforementioned circumferential band, as a result of which the arms will have a relatively long bending length, as a result of which the clamping force is improved.

Preferably the third and fourth clamping members are situated opposite each other's side that faces away from their own clamping surface, the arms, as scan from above, extending with a portion in the circumferential direction of the liquid container. As a result the space between both clamping members can simply be enlarged by pressing the arms a little towards each other in order to insert an object to be clamped in there. Moreover the forces exerted by the inner surface of the liquid container on the first clamping surfaces of the first clamping member will result in moments urging the third and the fourth clamping member towards each other.

The third and fourth clamping members may have a decorative shape, and may possibly be provided with roughened or profiled clamping surfaces. They may be substantially flat and possibly provided with an information carrying portion.

Alternatively the second clamping member may form a one-piece aid, such as a swizzle stick.

A—for instance disk-shaped—information carrying portion may alternatively also be provided on the first clamping member, preferably between both clamping surfaces.

The main body may preferably be situated radially outside of the liquid container and if so desired be functionally or decoratively designed.

BRIEF DESCRIPTION OF DRAWINGS

The invention will now be explained on the basis of the two exemplary embodiments shown in the attached drawings, in which.

DETAILED DESCRIPTION OF THE DRAWINGS

Figure 1:
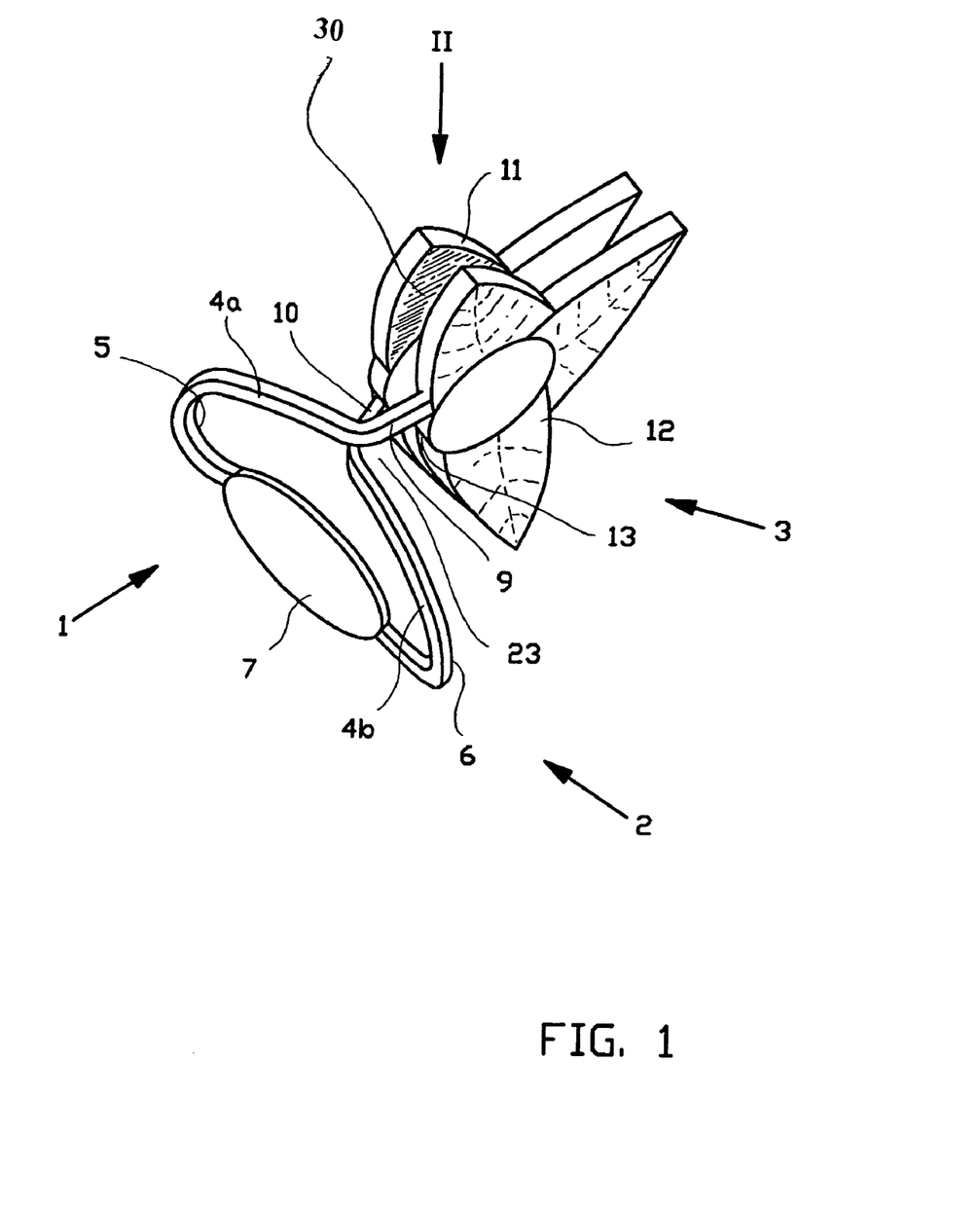
FIG. 1 is a side view on a first exemplary embodiment of an accessory according to the invention.
Figure 2:
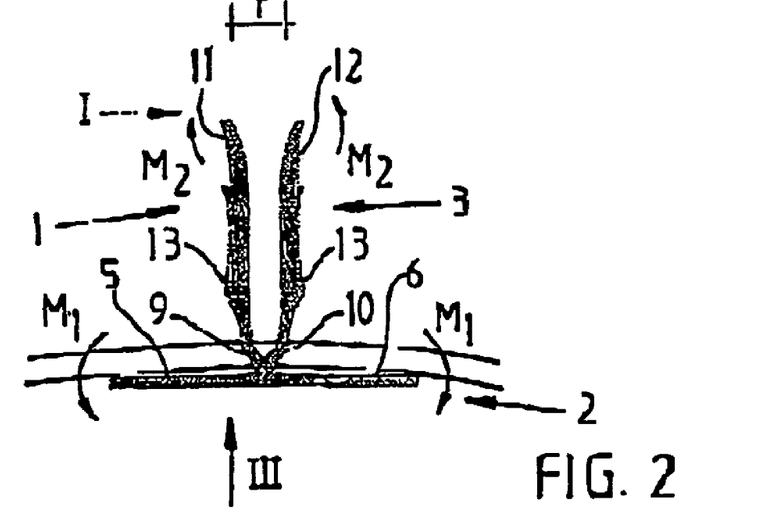
FIG. 2 is a top view on it according to arrow II.
Figure 3:
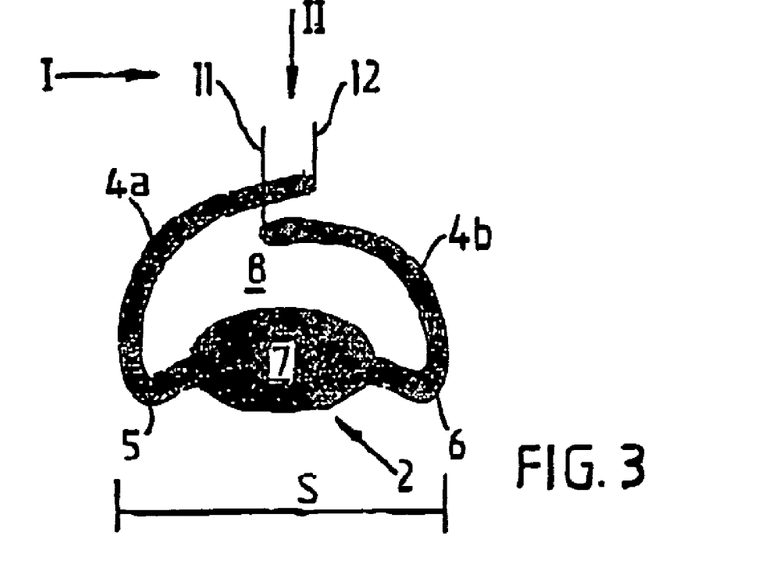
FIG. 3 is a front view on the accessory of FIGS. 1 and 2, according to arrow III.

The accessory 1 according to the invention shown in FIGS. 1–3 comprises a substantially annular clamping member 2, intended for being placed at the—concave—inner side of the wall of a glass or the like, and a clamping member 3 which in this example is transverse to it, intended to engage on the outer aide of the wall of the glass.

The clamping member 2 of elastic material comprises two curved arms 4a and 4b, which extend upwards and toward each other from two end portions 5 and 6, which are connected to each other by means of a portion, which comprises a small plate 7. The portions 5 and 6 are situated at the horizontal ends of the annular clamping member 2, at a distance S from each other and form clamping surfaces. The arms 4a, 4b and portion 7 extend with a component in horizontal direction.

As can be seen in FIG. 2 the clamping member 2 in unloaded situation is substantially situated in one flat plane. At their upper ends the arms 4a and 4b change into more radially oriented arms 9 and 10, which end in decorative FIGS. 11 and 12, which here have the shape of compound leaves, but may also be shaped in another way, possibly different from each other. The leaves 11 and 12 here form the clamping member 3, and are provided with clamping surface 13, which faces both other clamping surfaces 5 and 6. The leaves 11, 12, the arms 9 and 10 and the clamping member 2 form an inverted U with elastic legs, which define a receiving space 23 for easy positioning on the edge of a glass.

As can be seen in FIG. 2 the "leaves" 11 and 12 are situated at a distance T from each other. The leaves 11 and 12 however may also be situated against each other or be a unity. It may also be that only one of the leaves 11, 12 provide the clamping surface 13. What is important is that the position of the clamping surface 13 is such that a 3-point bearing with the clamping surfaces 5 and 6 is formed, in which the clamping surfaces 5 and 6 are situated at the concave side and the clamping surfaces or the clamping surface 13 by approximation is/are situated therebetween. The accessory 1 can then be clamped in a stable manner on the wall of the glass, as shown in the FIGS. 4 and 5 and (schematically) also in FIG. 2. The glass 20 has a wall 21, which in a curved manner runs through the slit-shaped space 23 between both clamping members 2 and 3, in which the clamping surfaces 5 and 6 press against the inner surface and the clamping surface 13 presses against the outer side of the wall 21 of the glass. Because of the open construction, with arms 4a and 4b and, in this exemplary embodiment the independent extension from each other of the arms 4a and 4b, the clamping member 2 can elastically deform to some extent, as a result of which moments $M_1$ are generated, which result in moments $M_2$ on the "leaves" 11 and 12, as a result of which said leaves are urged towards each other and with a larger force clamp an object, in particular an ingredient, in between them. The ingredient may for instance be a lemon slice 22, shown in the FIGS. 4 and 5.

Figure 4:
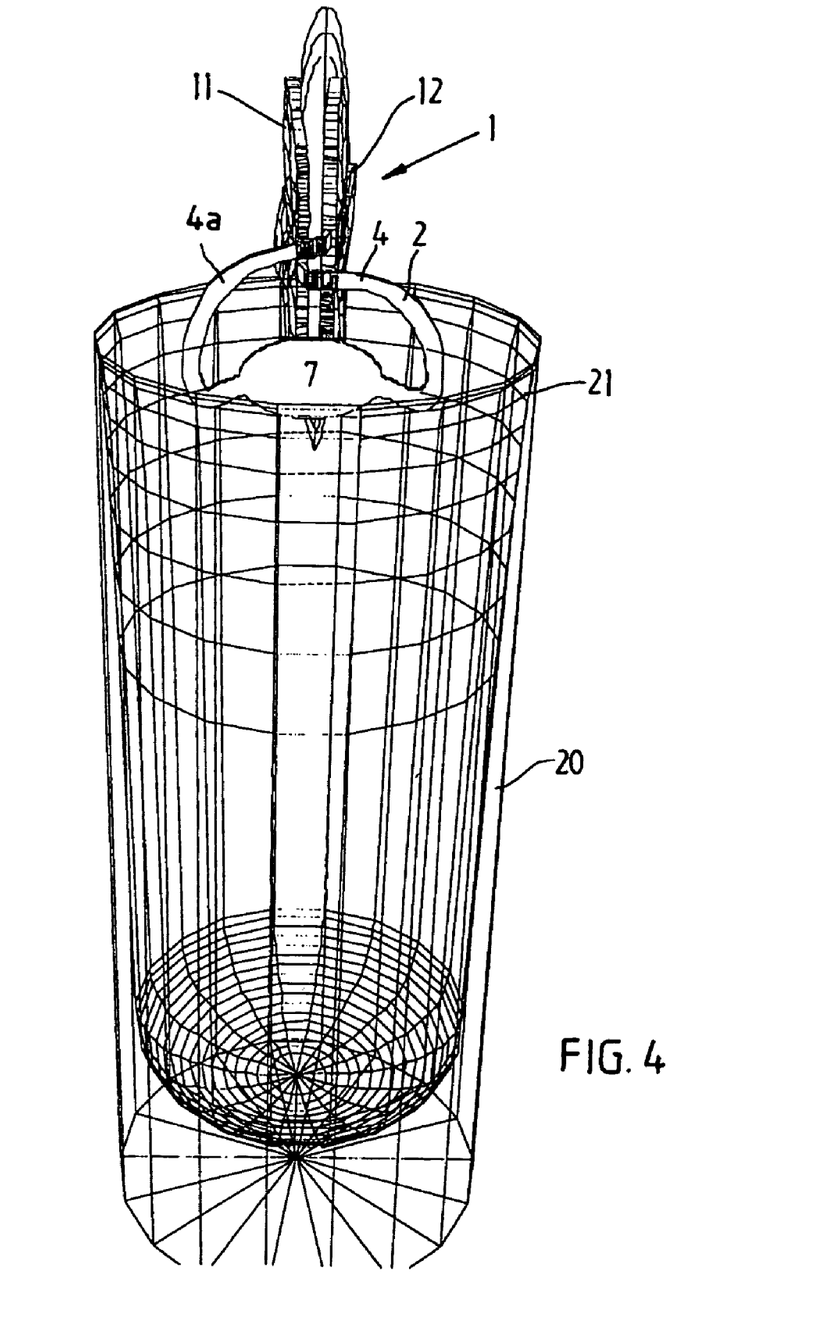
FIG. 4 is a view on the accessory of FIGS. 1–3, arranged on a glass.
Figure 5:
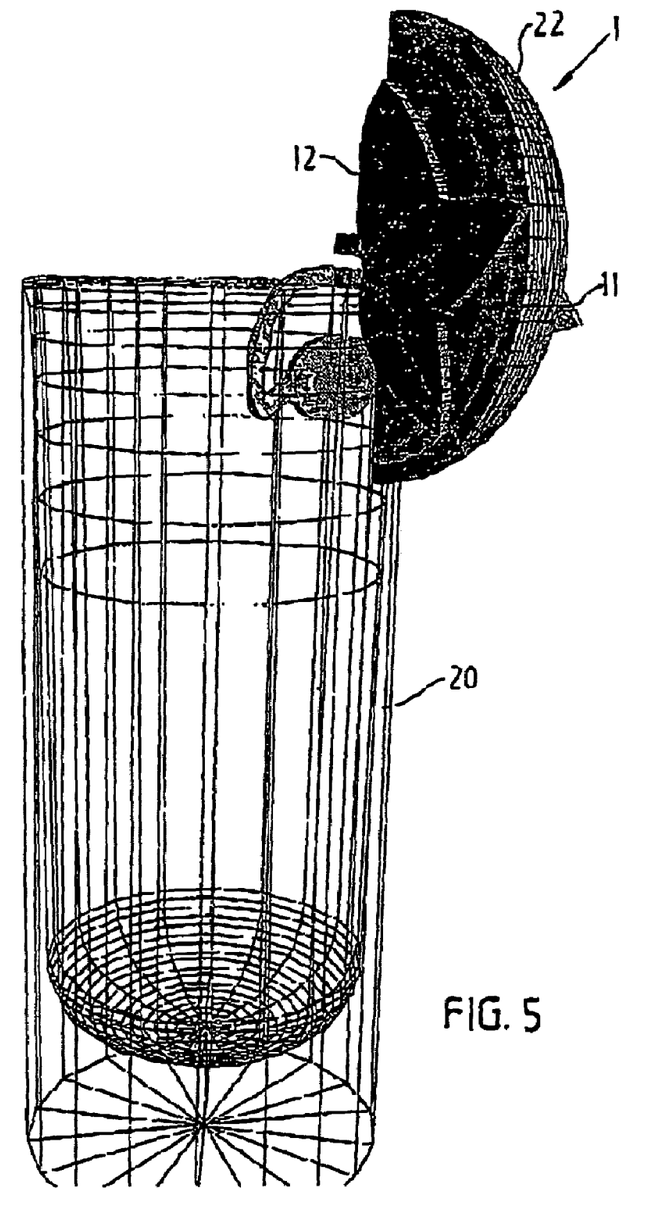
FIG. 5 is a view on the accessory of FIGS. 1–3, arranged on a glass, having an ingredient for a beverage in it.

The spring mounted arrangement of the clamping surfaces 5 and 6 provided by the arms 4a and 4b will result in the realisation of a good clamping action, independent of the curve of the glass wall. As a result of the curved course of the clamping surfaces 5, 8 and the arms 4a, 4b good contact with the wall of the glass will also be ensured in an inclined position, with a substantially same moment arm.

The plate 7 lends itself well for the application of a commercial announcement or the like. An inside surface 30 of the leaves 11 and 12 may be rough or profiled for improved grips.

The accessory 1 can in a simple way be formed as one unity by injection moulding of whatever suitable synthetic material.

The accessory 1 according to the invention in this example extends beyond the glass with the clamping member 3, so that it will not be in the way when someone wants to take a sip. The relatively large clamping force also allows for the accessory to remain on the glass when the beverage is drunk. If so desired the user, however, is able to easily remove the accessory 1 and put it away, in which the flat shape of the clamping member 2 can be used to place the accessory 1 on a table in a stable manner.

Figure 6A:
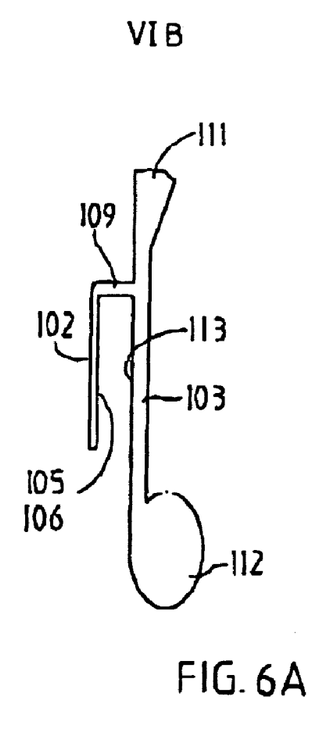
FIGS. 6A–C are a side view, a top view and a front view, respectively, on a second exemplary embodiment of an accessory according to the invention.
Figure 6B:
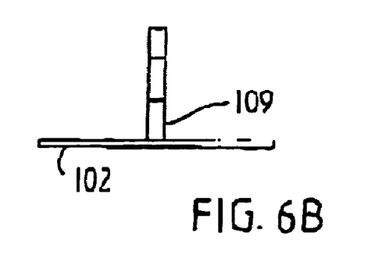
Figure 6C:
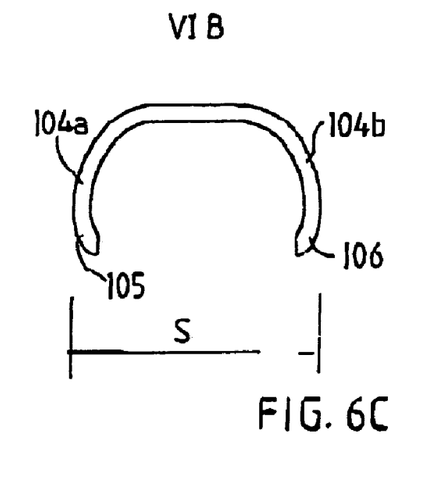
Figure 7:
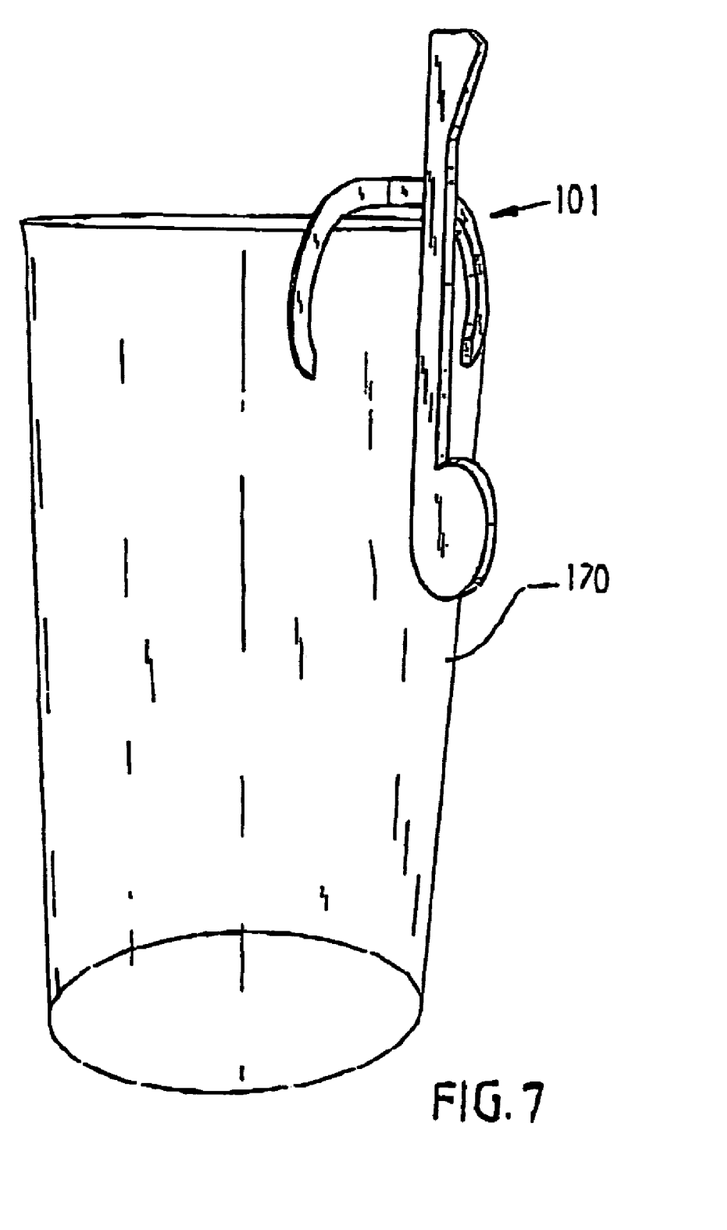
FIG. 7 is a view on the accessory of FIGS. 6A–C, arranged on a glass.

The accessory 101 shown in the FIGS. 6A 6C has a first clamping member 102 having the shape of a flat, half of a ring with two arms 104a, 104b which form clamping surfaces 105, 106. At its upper side the first clamping member 102 changes into a second clamping member 103 via radially oriented bridge part 109, which clamping member 103 comprises an upwardly projecting information or advertising plate 111 and a downwardly extending swizzle stick 112. The stem of the swizzle stick forms a clamping surface 113, which for clamping on a glass 120, as shown in FIG. 7, cooperates with the aforementioned clamping surfaces 105 and 106, in a manner comparable to the accessory of the FIGS. 1–5.

Other shapes for a "second" clamping member are possible, such as a brush or a cleaning aid.

What is claimed is:

1. An accessory for a container, the accessory comprising:
    first and second clamping members for placement on opposing sides of an upper edge of the container, the first clamping member comprising a plurality of elastically deformable extending portions that define at least first and second clamping surfaces spaced apart from each other, the second clamping member defining a third clamping surface, said first and second clamping members being connected and disposed with respect to each other such that the first clamping member is insertable into the container in an inserted position with the first and second clamping surfaces pressed against an inner surface of the container and with the third clamping surface of the second clamping member engaging an outer surface of the container with the third clamping surface disposed between the first and second clamping surfaces, each of said extending portions comprising a first subportion that extends away from a vertical axis of the second clamping member when the first clamping member is in the inserted position, wherein the first and second clamping surfaces are spring mounted with respect to each other.

2. The accessory according to claim 1, wherein the first and second clamping surfaces extend from opposite sides of the accessory.

3. The accessory according to claim 1, wherein the first clamping member has an arcuate shape.

4. The accessory according to claim 1, wherein the first and second clamping members have a spring connection with each other in a vertical plane.

5. The accessory according to claim 1, wherein the first and second clamping members define an inverted U-shape in a vertical cross-sectional plane, the U-shape providing an accommodation space for the container.

6. The accessory according to claim 1, wherein the first clamping member is disposable in a flat plane when the accessory is not inserted on the upper edge of the container.

7. The accessory according to claim 1, wherein the second clamping member comprises a holder for holding an object.

8. The accessory according to claim 1, wherein the accessory comprises means for displaying information.

9. The accessory according to claim 8, wherein said means for displaying information is situated between the first and second clamping surfaces.

10. The accessory according to claim 1, wherein the first and second clamping members are integrally formed with one another.

11. The accessory according to claim 10, wherein the accessory is made of a synthetic material.

12. The accessory according to claim 1, wherein the first and second clamping surfaces are supported by respective arms connected to one another to form a connecting portion that interconnects the first and second clamping surfaces.

13. The accessory according to claim 12, wherein said connecting portion comprises means for displaying information.

14. The accessory according to claim 1, wherein the first subportion of each of the extending portions extends in a direction that is transverse to a vertical axis of the second clamping member when the first clamping member is in the inserted position.

15. The accessory according to claim 1, wherein the holder comprises third and fourth clamping members, said third and fourth clamping members comprising respective arms which extend from the first and second clamping surfaces.

16. The accessory according to claim 15, wherein the respective arms are spring mounted with respect to each other.

17. The accessory according to claim 15, wherein the third and fourth clamping members have respective clamping surfaces that face each other in an orientation that is substantially transverse to an orientation between the first, second and third clamping surfaces, said arms extending with a portion along a circumference of the container when the accessory is inserted into the container.

18. The accessory according to claim 15, wherein the third and fourth clamping members have a decorative shape.

19. The accessory according to claim 15, wherein the third and fourth clamping members are flat.

20. The accessory according to claim 19, wherein the third and fourth clamping members comprise rough or profiled surfaces.

21. The accessory according to claim 1, wherein the second clamping member comprises a swizzle stick.

22. An accessory for a container, the accessory comprising:
    first and second clamping members for placement on opposing sides of an upper edge of the container, the first clamping member comprising a plurality of elastically deformable extending portions that define at least first and second clamping surfaces spaced apart from each other, the second clamping member defining a third clamping surface, said first and second clamping members being connected and disposed with respect to each other such that the first clamping member is insertable into the container in an inserted position with the first and second clamping surfaces pressed against an inner surface of the container and with the third clamping surface of the second clamping member engaging an outer surface of the container with the third clamping surface disposed between the first and second clamping surfaces, each of said extending portions comprising a first subportion that extends away from a vertical axis of the second clamping member when the first clamping member is in the inserted position, wherein the first and second clamping surfaces have respective edges that face away from each other, each of the edges having a convex curve.

23. The accessory according to claim 22, wherein said convex curve has a center or centers situated between the first and second clamping surfaces.

24. An accessory for a container, the accessory comprising:
    first and second clamping members for placement on opposing sides of an upper edge of the container, the first clamping member comprising a plurality of elastically deformable extending portions that define at least first and second clamping surfaces spaced apart from each other, the second clamping member defining a third clamping surface, said first and second clamping members being connected and disposed with respect to each other such that the first clamping member is insertable into the container in an inserted position with the first and second clamping surfaces pressed against an inner surface of the container and with the third clamping surface of the second clamping member engaging an outer surface of the container with the third clamping surface disposed between the first and second clamping surfaces, each of said extending portions comprising a first subportion that extends away from a vertical axis of the second clamping member when the first clamping member is in the inserted position, wherein the second clamping member comprises a holder for holding an object, wherein the holder comprises third and fourth clamping members, said third and fourth clamping members comprising respective arms which extend from the first and second clamping surfaces.

25. The accessory according to claim 24, wherein the respective arms are spring mounted with respect to each other.

26. The accessory according to claim 24, wherein the third and fourth clamping members have respective clamping surfaces that face each other in an orientation that is substantially transverse to an orientation between the first, second and third clamping surfaces, said arms extending with a portion along a circumference of the container when the accessory is inserted into the container.

27. The accessory according to claim 24, wherein the third and fourth clamping members have a decorative shape.

28. The accessory according to claim 24, wherein the third and fourth clamping members are flat.

29. The accessory according to claim 28, wherein the third and fourth clamping members comprise rough or profiled surfaces.

30. An accessory for a container, the accessory comprising:
first and second clamping members for placement on opposing sides of an upper edge of the container, the first clamping member comprising a plurality of elastically deformable extending portions that define at least first and second clamping surfaces spaced apart from each other, the second clamping member defining a third clamping surface, said first and second clamping members being connected and disposed with respect to each other such that the first clamping member is insertable into the container in an inserted position with the first and second clamping surfaces pressed against an inner surface of the container and with the third clamping surface of the second clamping member engaging an outer surface of the container with the third clamping surface disposed between the first and second clamping surfaces, each of said extending portions comprising a first subportion that extends away from a vertical axis of the second clamping member when the first clamping member is in the inserted position, wherein the second clamping member comprises a swizzle stick.

31. An accessory for a container, the accessory comprising first and second clamping members arranged on either side of a first plane to define a receiving space for a wall of a container, wherein the first and second clamping members are connected with each other for resilient movement with respect to each other in a second plane transverse to said first plane, wherein said first clamping member defines first and second clamping surfaces spaced from one another in a first direction perpendicular to said second plane, wherein said second clamping member defines a third clamping surface which is located between said first and second surfaces when considered in said first direction, and wherein said first and second clamping surfaces of said first clamping member are connected with each other to be resiliently movable with respect to each other in a third plane transverse to said first plane and said second plane.

32. An accessory for a container, the accessory comprising:
first and second clamping members for placement on opposing sides of an upper edge of the container, the first clamping member comprising a plurality of elastically deformable extending portions that define at least first and second clamping surfaces spaced apart from each other, the second clamping member defining a third clamping surface, said first and second clamping members being connected and disposed with respect to each other such that the first clamping member is insertable into the container in an inserted position with the first and second clamping surfaces pressed against an inner surface of the container and with the third clamping surface of the second damning member engaging an outer surface of the container with the third clamping surface disposed between the first and second clamping surfaces, wherein the first and second clamping surfaces are spring mounted with respect to each other, wherein each of the extending portions comprises:
(i) a first subportion extending along the upper edge of the container when the accessory is inserted into the container, and
(ii) a second subportion that is substantially perpendicular to the first subportion.

* * * * *